United States Patent Office 3,305,513
Patented Feb. 21, 1967

3,305,513
PRESSURE-SPRAYABLE WATER-SOLUBLE ALKYL METHACRYLATE POLYMER SOLUTIONS
Robert J. Gander, Whitehouse, N.J., assignor to Johnson & Johnson, a corporation of New Jersey
No Drawing. Filed Apr. 9, 1964, Ser. No. 358,648
7 Claims. (Cl. 260—33.2)

The present invention relates to water-soluble film-forming compositions and more particularly to pressure-sprayable solutions of water-soluble film-forming polymers in which the propellent is the sole solvent for the film-forming polymer.

Because of the convenience of application, it is becoming increasingly popular to apply film-forming compositions from pressurized containers in the form of a fine mist or spray. The pressure is obtained by including in the container a highly volatile liquid that is a gas at ordinary room temperatures and pressures. Because of the insolubility of most film-formers in such volatile propellent liquids, it has been the practice to first prepare a solution of the film-forming polymer in a conventional solvent, such for example as acetone, ethyl acetate, or ethanol and then to charge the container with this solution and the propellent liquids to be used.

These solvents, however, are generally not readily released by the film-forming polymer and tend to evaporate relatively slowly. Propellents, on the other hand, although present as liquids in the pressurized container are gases at normal room temperature and, accordingly, evaporate rapidly. I have discovered that many polymers of alkyl methacrylates, both homopolymers and copolymers with other monomers, are generally soluble in certain propellents, hereinafter called solvent propellents, where the alkyl group is not too small, i.e., where it contains at least four carbon atoms and where the alkyl methacrylate is present in amounts of at least 50 percent by weight of the polymer. However, all solutions of such methacrylate polymers will not give satisfactory sprayable film-forming compositions. Also films formed from such polymers are generally insoluble in water and, accordingly, where applied to a patient, must either be peeled off or permitted to wear off or must otherwise be removed by the use of organic solvents.

It is an object of the present invention to prepare pressure-sprayable alkyl methacrylate film-forming compositions wherein the sole solvent for the film-forming polymer is a propellent solvent and in which the film-forming polymer is water-soluble. It is a further object to prepare pressure-sprayable solutions of water-soluble film-forming alkyl methacrylate polymers wherein the only solvent for the polymer is one of the propellent liquids used and which when released from pressure through a dispensing valve in accordance with conventional aerosol technique will be dispensed in the form of a fine spray or droplets which when applied to the skin of the patient will form a thin adherent and protective film. Other objects and advantages of this invention will become apparent from the following description wherein are set forth by way of illustration and example certain embodiments of the same.

Although the alkyl methacrylate polymers are found to be generally soluble in propellent solvents where the alkyl group contains at least four carbon atoms and the alkyl methacrylate is present in amounts of at least 50 percent by weight of the polymer, these polymers are insoluble in water making it necessary to use organic solvents to remove the same after application. It is, as previously indicated, for many uses highly desirable to have such films water-soluble so that the same, after being formed, can be removed by washing with water.

I have now discovered certain polymeric amine salts that form skin adherent films that are both water-soluble and soluble in propellent solvents. These are amine hydrochloride salts prepared by copolymerizing n-butyl methacrylate and lauryl methacrylate in proportional amounts of about 1 part by weight of lauryl methacrylate for about each 1 to 3 parts by weight n-butyl methacrylate with an amine-containing monomer of the group consisting of dimethylaminoethyl methacrylate and tert.-butylaminoethyl methacrylate, the amine containing monomer comprising about 25% by weight of the total terpolymer composition. The hydrochloride salt may be prepared by either using the amine containing monomer in its hydrochloride salt form or by treating the terpolymer, after polymerization, with hydrochloric acid to form the hydrochloride salt of the same. The latter procedure is the preferred manner of making the terpolymer salts.

The terpolymer amine hydrochloride salts of the present invention go through a gel state prior to dissolving in water. The particular monomer used appears to have a substantial effect on the period of time between the initial gel formation and complete solution of the terpolymer amine salt in water. Thus polymer films formed by using the amine-containing monomer dimethylaminoethyl methacrylate are removed relatively rapidly by washing with a water at general cold water tap temperature. However, terpolymer amine hydrochloride salts of tert.-butylaminoethyl methacrylate take a substantially longer time to pass through the gel stage into solution thus requiring a substantially longer period to remove, by water washing, films formed of the terpolymer amine hydrochloride salt. However, washing in warm water substantially decreases the period of washing required.

It is apparently the presence of the amine hydrochloride which causes the water solubilizing of the methacrylate polymer to the point where films of the same can be removed from the skin by washing. It is also the presence of the amine hydrochloride part of the terpolymer, when present in too large amounts, which inhibits the dissolving of the polymer in the propellent solvent.

As previously indicated, the amine-containing monomer should be present in amounts of about 25% by weight of the terpolymer. When present in amounts much in excess of 25% by weight, the terpolymer is no longer sufficiently soluble in the propellent solvent to prepare syrayable compositions of the same without the inclusion of additional solvents which substantially increase the drying time of any polymer films formed. When the amine-containing monomer is present in amounts of substantially less than 25% by weight, the hydrochloride salt of the terpolymer is no longer soluble in water. This is well illustrated by the following table:

also solvents for the alkyl acrylate film-forming polymers used.

SOLUBILITY BEHAVIOR OF AMINE HYDROCHLORIDE METHACRYLATE TERPOLYMERS

| Polymer Composition, weight percent [1] | | | | Rel.Vis. of Free Base [2] | Neut. Equiv. of Free Base [3] | Hydrochloride Solubility | |
|---|---|---|---|---|---|---|---|
| BMA | LMA | DMAEMA | TBAEMA | | | Water [4] | Fluorocarbon [5] |
| 40 | 40 | 20 | ---------- | 1.24 | 797 | Insoluble____ | Soluble. |
| 18.7 | 56.3 | 25 | ---------- | 1.24 | 654 | Soluble_____ | Insoluble. |
| 37.5 | 37.5 | 25 | ---------- | 1.24 | 630 | ____do_____ | Soluble. |
| 56.3 | 18.7 | 30 | ---------- | 1.25 | 639 | ____do_____ | Do. |
| 35 | 35 | ---------- | 20 | 1.32 | 557 | ____do_____ | Insoluble. |
| 40 | 40 | ---------- | 25 | 1.33 | 943 | Insoluble____ | Soluble. |
| 37.5 | 37.5 | ---------- | 27.4 | 1.32 | 773 | Soluble_____ | Do. |
| 36.3 | 36.3 | ---------- | 30 | 1.33 | 708 | ____do_____ | Insoluble. |
| 35 | 35 | ---------- | ---------- | 1.34 | 636 | ____do_____ | Do. |

[1] BMA=n-Butyl methacrylate; LMA=Lauryl methacrylate; DMAEMA=Dimethylaminoethyl methacrylate; TBAEMA=tert.-Butylaminoethyl methacrylate.
[2] At a concentration of 1.000 g./100 ml. in toluene at 30° C.
[3] By potentiometric titration in 50–50 benezne ethanol using 0.1 N ethanolic hydrochloric acid.
[4] At a concentration of 0.2 gram in 100 ml. water.
[5] At a concentration of 3% in 65% Propellent 11 and 35% Propellent 12.

Although alkyl methacrylate terpolymers of the type herein described are found to be soluble in propellent solvents a pressure-sprayable solution is not necessarily obtained. Sprayable compositions or solutions are only obtained if the free base polymer used has a relative viscosity of not appreciably above 1.60 and is present in solution in the propellent solvent in a concentration of not appreciably over 6.0 weight percent. Free base polymer refers to the amine-containing polymer before conversion to the amine salt. Where the relative viscosity of the polymer is appreciably greater than about 1.6, or where the concentration in the propellent solvent is appreciably above 6.0%, a wet jet-like stream is obtained rather than a spray. Relative viscosities are measured at 30° C. in toluene solutions of the polymer at a concentration of 1.000 gram per 100 ml.

The alkyl methacrylate trepolymer films are applied by dispensing the same under pressure from a pressurized container wherein the polymer is present in the form of a solution in one of the propellents used. The propellent pressure in the container is preferably in the range of about 20 to 60 pounds per square inch gauge at a temperature of 75° F. Where the solvent propellent used will not by itself give a sufficiently high total pressure, other propellents are employed together with the solvent propellent to give the pressure desired.

PROPELLENTS

As previously indicated, in practicing the present invention the film-forming polymer is not dissolved in the usual resin solvents but is dissolved in a propellent solvent. The term propellent, as herein used, is used in the conventional sense. A propellent is, for example, defined in Aerosols: Science and Technology, Interscience Publishers, Inc., New York, New York, page 214, as "a liquefied gas with a vapor pressure greater than atmospheric pressure (14.7 p.s.i.a.) at a temperature of 105° F." This definition is sufficiently broad to include some liquids which, used alone, would not function as propellents, but in solution with selected liquefied gases make satisfactory pressurized systems. An example is methylene chloride whose boiling point is 105° F., at which temperature its vapor pressure equals atmospheric pressure. Thus it just falls within the limits of the definition. At ordinary room temperature, methylene chloride has a vapor pressure below atmospheric pressure and cannot function as a propellent but, when dissolved in a liquid of high vapor pressure, it will give resultant pressures satisfactory for application to an aerosol system.

Propellent solvents are those propellents which are also solvents for the alkyl acrylate film-forming polymers used.

Propellent solvents generally available are trichlorofluoromethane ($CCl_3F$), generally referred to in the trade as Propellent 11; dichlorofluoromethane ($CHCl_2F$), generally referred to in the trade as Propellent 21; vinyl chloride ($CH_2\!\!=\!\!CHCl$), and dimethyl ether ($CH_3OCH_3$).

Of these propellent solvents, the one preferred and the one found to give the best results with the film-forming terpolymers of the present invention is Propellent 11. Propellent 11 is a good solvent for the film-forming polymers and is readily released by the polymers after being dispensed from the pressurized container. Where Propellent 11 is used as the propelent solvent, it is used together with another propellent, such as Propellent 12, dichlorodifluoromethane, in order to increase the pressure in the container to the desired 20 to 60 pounds per square inch guage at 75° F.

With respect to the other propellent solvents referred to, Propellent 21 is a good solvent for film-forming resins suitable for use in the present invention. This particular propellent solvent, however, has the characteristic that it is retained somewhat more tenaciously by the alkyl methacrylate terpolymers than is Propellent 11 even though it boils at a substantially lower temperature than Propellent 11. This is apparently due to the strong associative hydrogen bonding between Propellent 21 and the resin molecules. Accordingly, for more rapid drying Propellent 11 is preferred.

The vinyl chloride propellent is a good solvent for the alkyl methacrylate terpolymers. However, the vinyl chloride propellent has the characteristic of being retained more tenaciously by the dissolved polymer, after the same has been sprayed in to a film in much the same manner as is Propellent 21. It, accordingly, gives a much slower drying rate for the polymer film despite the fact that the vinyl chloride boils at +7.9° F. As the vinyl chloride has a gauge pressure of 34 pounds per square inch at 70° F., it can be used alone without a further propellent. However, the flammable nature of the vinyl chloride together with its tendency to be retained by the alkyl acrylate and alkyl methacrylate polymers makes it generally unsuitable for use alone as the propellent solvent in the preferred formulations of the present invention.

Dimethyl ether is another fairly good propellent solvent which is a relatively good solvent for the alkyl methacrylate terpolymers. The dimethyl ether has a boiling point of −12.7° F. and a gauge pressure at 70° F. of 60 pounds per square inch. However, the dimethyl ether is flammable and has an ethereal odor, both of which properties make it generally unsuitable for surgical purposes when used alone particularly where sparks or open flame may be encountered.

As is clear from the above, the preferred propellent solvent is Propellent 11. The other propellent solvents can, however, be used particularly where used in blends with Propellent 11. They may also, in some instances, be used without any Propellent 11 being present. However, Propellent 11 is preferred, either as the sole propellen solvent or as the major propellent solvent where blended with any of the other propellent solvents mentioned. The blending of Propellent 11 with vinyl chloride best illustrates some of the advantages obtained by using at least some Propellent 11. Vinyl chloride has been indicated as being flammable and, accordingly, generally undesirable in the preferred compositions. However, the vinyl chloride can be used in minor amounts in blends with Propellent 11 and non-solvent Propellent 12 to give satisfactory nonflammable propellent compositions. For example, the following formulations are nonflammable and give the indicated pressure at 70° F.

| Weight Percent | | | Pressure at 70° F. p.s.i.g. |
| --- | --- | --- | --- |
| Prop. 11 | Prop. 12 | ViCl | |
| 43 | 37 | 20 | 39 |
| 39 | 39 | 22 | 36.5 |
| 45 | 20 | 35 | 34 |
|  | 65 | 35 | 61 |
|  | 80 | 20 | 66 |

Although various propellent blends can be used as long as they contain a solvent propellent and give a pressure of about 20 to 60 pounds per square inch gauge in the pressurized container at a temperature of 75° F., the propellent formulation preferred is 40 to 70 weight percent solvent Propellent 11 and 60 to 30 weight percent nonsolvent Propellent 12. In further describing the invention propellent mixtures consisting of 65 weight percent solvent Propellent 11 and 35 weight percent nonsolvent Propellent 12 will be used.

PROPELLENT SOLUTION OF FILM-FORMING POLYMER

As previously indicated, the alkyl methacrylate amine terpolymer hydrochloride salts of the present invention are generally soluble in the propellent solvents, heretofore discussed. However, satisfactory propellent solutions of the terpolymers cannot be obtained unless the polymer has a relative viscosity of not appreciably above 1.60 and is present in the propellent solvent in a concentration of not appreciably over 6.0 weight percent.

The effect of concentration of polymer in the propellent solvent is well illustrated by the following table. This table shows the spray characteristics of solutions of the hydrochloride salt of the terpolymer containing 37.5% n-butyl methacrylate, 37.5% lauryl methacrylate and 25% dimethylaminoethyl methacrylate. The terpolymer is dissolved in a propellent solvent consisting of 65 percent trichlorofluoromethane and 35 percent dichlorodifluoromethane. The ingredients are placed in 6-ounce pressure cans which are closed with conventional aerosol spray nozzles.

Terpolymers, weight percent:   Spray character
- 3.0 _____ Fine spray.
- 5.0 _____ Do.
- 7.0 _____ Fine spray, but polymer precipitates and collects on the valve orifice.
- 9.0 _____ Coarse wet spray with heavy precipitation of polymer on the valve orifice.

The following examples, given for the purpose of illustration only will help to further illustrate the practice of the present invention:

Example I 1-liter, 3-neck flask is provided with a reflux condenser, a mechanical stirrer, a nitrogen inelt tube, and a thermometer. The flask is charged with 56.2 grams of n-butyl methacrylate, 56.2 grams of lauryl methacryate, 37.6 grams of dimethylaminoethyl methacrylate and 150 grams of ethyl acetate. During a 15-minute period the reaction mixture is heated to 75–80° C. and stirred while a slow stream of nitrogen is swept through the apparatus. Nitrogen flow is then discontinued and 0.76 gram of 2,2′-azobisisobutyronitrile is added. The reaction mixture is stirred and heated at 80–85° C. for 4.0 hours. It is then cooled to room temperature. The solids content of a sample heated for 5 hours at 105° C. is 48.1 percent.

The ethyl acetate is dried from the polymer by casting the solution in a thin film on silicone-coated paper, then drying at 160° F. The tacky polymer has a relative viscosity of 1.24 (1.000 g./100 ml., toluene solution at 30° C.). The neutral equivalent of the polymer is 630, measured by titrating samples potentiometrically with 0.1 N ethanolic hydrochloric acid in a solution of 50 percent benzene and 50 percent ethanol.

The hydrochloride salt of the polymer is prepared by neutralizing 100 grams of the reaction mixture with 39.6 ml. of 1.93 N ethanolic hydrochloric acid. The salt is dried on silicone-coated paper. It is a rather flexible, non-tacky material which dissolves in water at a concentration of 0.2 gram per 100 ml. It dissolves at a concentration of 3 percent in a blend of 65 weight percent trichlorofluoromethane and 35 percent dichlorodifluoromethane, forming a colorless, mobile solution.

Example II

The polymerization procedure of Example I is repeated using a monomer charge of 56.2 grams of n-butyl methacrylate, 56.2 grams of lauryl methacrylate and 37.6 grams of tert.-butylaminoethyl methacrylate. After polymerization, the reaction mixture has a solids content of 44.1 percent. The polymer has a relative viscosity of 1.32 and a neutral equivalent of 773.

The hydrochloride salt is prepared by neutralizing 100 grams of the reaction mixture with 30.4 ml. of 1.88 N ethanolic hydrochloric acid. The salt is soluble both in water and in a blend of 65 percent trichlorofluoromethane and 35 percent dichlorodifluoromethane.

Example III

The polymerization procedure of Example I is repeated using a monomer charge of 84.4 grams of n-butyl methacrylate, 28.0 grams of lauryl methacrylate and 37.6 grams of dimethylaminoethyl methacrylate. After polymerization, the reaction mixture has a solids content of 46.6 percent. The polymer has a relative viscosity of 1.25 and a neutral equivalent of 639.

The hydrochloride salt is prepared by neutralizing 100 grams of the reaction mixture with 37.8 ml. of 1.93 N ethanolic hydrochloric acid. The salt is soluble in water and in a blend of 65 percent trichlorofluoromethane and 35 percent dichlorodifluoromethane.

Example IV

Solutions of the hydrochloride salts of Examples I and II are made in each of the four propellent systems shown in the following table. The polymer concentration is three weight percent in each case. The solutions are prepared in aerosol cans and closed with spray valves.

No:   Propellent solvent
1 -- 65% trichlorofluoromethane–35% dichlorofluoromethane.
2 -- 90% vinyl chloride–10% trichlorofluoromethane.

No.—Continued  Propellent solvent
3 -- 60% dichlorofluoromethane–40% dichlorodifluoromethane.
4 -- 100% dimethyl ether.

When discharged through the aerosol valve, each of the solutions produces a finely atomized spray. When applied to the skin, the propellent solvent evaporates rapidly leaving a thin film which can be removed by washing with water.

Particular embodiments of the invention have been used to illustrate the same. The invention, however, is not limited to these specific embodiments. In view of the foregoing disclosure, variations or modifications thereof will be apparent, and it is intended to include within the invention all such variations and modifications except as do not come within the scope of the appended claims.

Having thus described my invention, I claim:

1. In a pressurized system for spray application a solution of a film-forming polymer in propellent the solvent for said polymer in said system consisting essentially of a propellent used in said system the propellent of said system including at least one propellent solvent of the group consisting of trichlorofluoromethane, difluorochloromethane, vinyl chloride and dimethyl ether, said film-forming polymer being an amine hydrochloride salt of a terpolymer of n-butyl methacrylate, lauryl methacrylate and at least one amine-containing monomer of the group consisting of dimethylaminoethyl methacrylate and tert.-butylaminoethyl methacrylate, the amine-containing monomer portion of said terpolymer consisting of about 25% by weight of the same and the n-butyl methacrylate and lauryl methacrylate portions being present in amounts of 1 part by weight n-butyl methacrylate for each 1 to 3 parts by weight of said lauryl methacrylate, said terpolymer in the free base polymer form having an intrinsic viscosity of not over 1.6 and present in said solution in a concentration of not over 6.0 percent by weight.

2. A pressurized system of claim 1 in which the amine-containing monomer is dimethylaminoethyl methacrylate.

3. A pressurized system of claim 2 in which the major portion of propellent solvent is trichlorofluoromethane.

4. A pressurized system of claim 3 in which said propellent consists essentially of 75 to 25 parts by weight of trichlorofluoromethane and 25 to 75 parts by weight of dichlorodifluoromethane.

5. A pressurized system of claim 1 in which the amine-containing monomer is tert.-butylaminoethyl methacrylate.

6. A pressurized system of claim 5 in which the major portion of propellent solvent is trichlorofluoromethane.

7. A pressurized system of claim 6 in which said propellent consists essentially of 75 to 25 parts by weight of trichlorofluoromethane and 25 to 75 parts by weight of dichlorodifluoromethane.

References Cited by the Examiner

UNITED STATES PATENTS

| | | | |
|---|---|---|---|
| 2,617,780 | 11/1952 | Lutz | 260—33.8 |
| 2,897,172 | 7/1959 | Maeder | 260—33.8 |
| 3,062,751 | 11/1962 | Wahlin | 167—82 |

MORRIS LIEBMAN, *Primary Examiner.*

L. T. JACOBS, *Assistant Examiner.*